United States Patent
Paes et al.

(10) Patent No.: US 12,533,980 B2
(45) Date of Patent: Jan. 27, 2026

(54) TEMPERATURE BASED CHARGING CONTROL

(71) Applicant: Rivian IP Holdings, LLC, Irvine, CA (US)

(72) Inventors: Paulo Lucena Kreppel Paes, Irvine, CA (US); Wendy Wai-Lan Siu, Torrance, CA (US); Do Hyun Yoon, Laguna Niguel, CA (US); Tyler Jennings Bennett, Long Beach, CA (US); Ajay Panekkad, Laguna Niguel, CA (US); Jacob Oberlin, San Jose, CA (US)

(73) Assignee: Rivian IP Holdings, LLC, Irvine, CA (US)

(*) Notice: Subject to any disclaimer, the term of this patent is extended or adjusted under 35 U.S.C. 154(b) by 234 days.

(21) Appl. No.: 18/362,803

(22) Filed: Jul. 31, 2023

(65) Prior Publication Data
US 2025/0042285 A1 Feb. 6, 2025

(51) Int. Cl.
*B60L 53/62* (2019.01)
*B60L 53/16* (2019.01)
*G01K 3/10* (2006.01)

(52) U.S. Cl.
CPC ............... *B60L 53/62* (2019.02); *B60L 53/16* (2019.02); *G01K 3/10* (2013.01)

(58) Field of Classification Search
CPC ...... B60L 53/62; B60L 53/16; B60L 2240/36; G01K 3/10; Y02T 10/70; Y02T 10/7072
See application file for complete search history.

(56) References Cited

U.S. PATENT DOCUMENTS

| | | | |
|---|---|---|---|
| 10,310,020 B2 * | 6/2019 | Biletska | G01R 31/387 |
| 2019/0140245 A1 * | 5/2019 | Mensch | H02H 3/08 |
| 2023/0406134 A1 * | 12/2023 | Wang | B60L 53/62 |

* cited by examiner

*Primary Examiner* — Michael C Zarroli
(74) *Attorney, Agent, or Firm* — Foley & Lardner LLP

(57) ABSTRACT

A system can include a data processing system including one or more memory devices coupled with one or more processors. The data processing system can receive measurements of a temperature of a connector of a vehicle, the connector to charge the vehicle. The data processing system can determine a derivative using the measurements. The data processing system can control charging of the vehicle based on the derivative.

18 Claims, 4 Drawing Sheets

TEMPERATURE BASED CHARGING CONTROL

INTRODUCTION

A vehicle, such as an electric vehicle, can include batteries. The vehicle can charge the batteries with a charger or at a charging station.

SUMMARY

At least one aspect is directed to a system. The system can include a data processing system including one or more memory devices coupled with one or more processors to receive measurements of a temperature of a connector of a vehicle, the connector to charge the vehicle. The data processing system can determine a derivative using the measurements. The data processing system can control charging of the vehicle based on the derivative.

At least one aspect is directed to a method. The method can include receiving, by a data processing system including one or more memory devices coupled with one or more processors, measurements of a temperature of a connector of a vehicle, the connector to charge the vehicle. The method can include determining, by the data processing system, a derivative using the measurements. The method can include controlling, by the data processing system, charging of the vehicle based on the derivative.

At least one aspect is directed to one or more storage medium storing instructions thereon, that, when executed by one or more processors, cause the one or more processors to receive measurements of a temperature of a connector of a vehicle, the connector to charge the vehicle. The instructions can cause the one or more processors to determine a derivative using the measurements. The instructions can cause the one or more processors to control charging of the vehicle based on the derivative.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
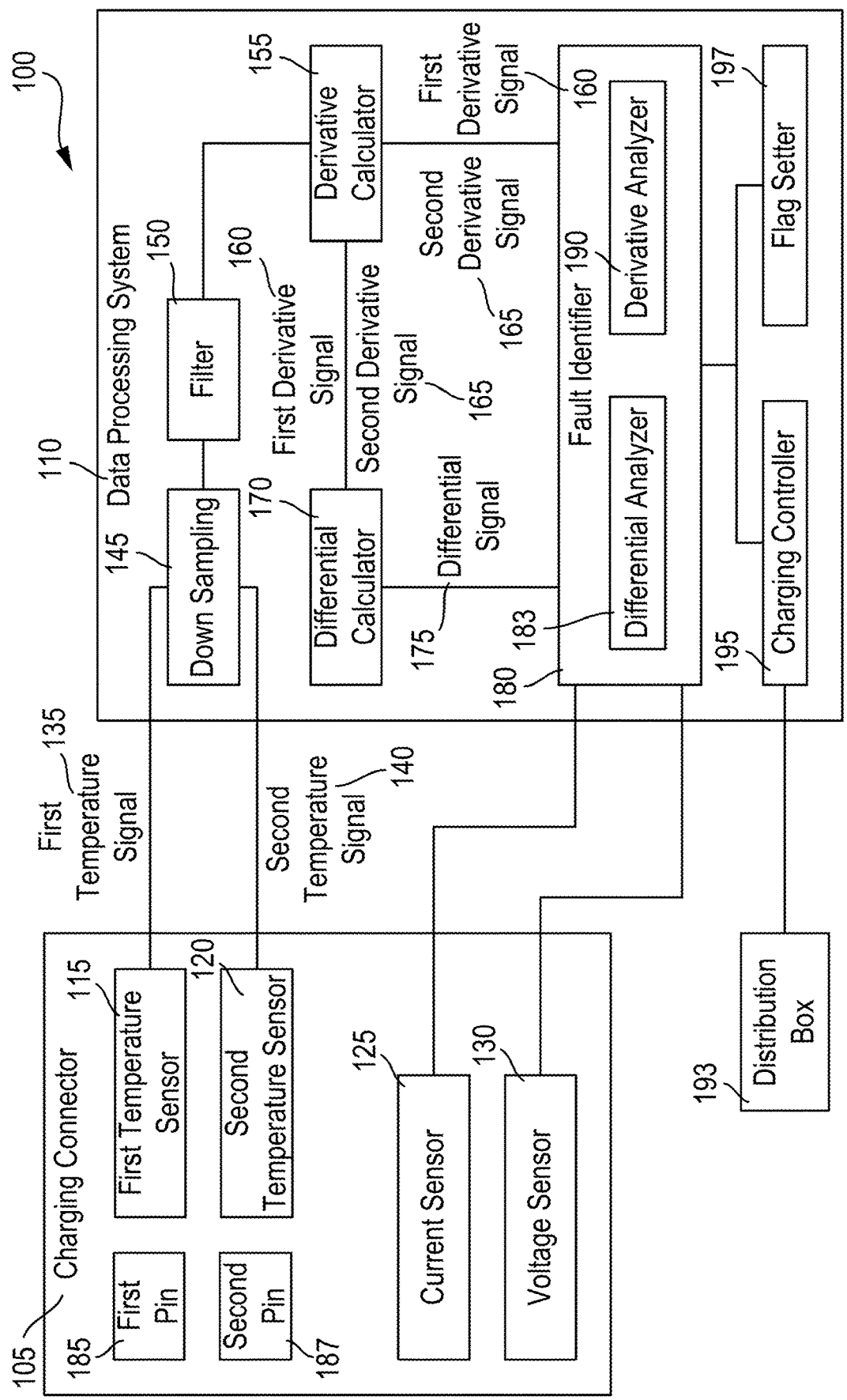
FIG. 1 depicts an example system including a data processing system that controls vehicle charging based on a derivative of a temperature signal.

Following below are more detailed descriptions of various concepts related to, and implementations of, methods, apparatuses, and systems of vehicle charging. The various concepts introduced above and discussed in greater detail below may be implemented in any of numerous ways.

This disclosure is generally directed to techniques for controlling vehicle charging based on temperature. A vehicle that includes a battery, such as an electric vehicle, can charge via at least one plug or connector that couples the vehicle with a charging station, device, or apparatus. The plug can be a component of the vehicle that includes pins that electrically couple the vehicle with the charging station to receive power from the charging station. As the vehicle charges, the plug or another component or material of the vehicle can accumulate energy over time. The accumulation of energy can cause a thermal event to occur. The plug can include at least one temperature sensor in or near the plug. For example, the plug can include a first temperature sensor at or near a first pin of the plug (e.g., a positive pin) and a second temperature sensor at or near a second pin of the plug (e.g., a negative pin). The plug can include pins or electrical conductors to receive alternating current (AC) power or direct current (DC) power.

Responsive to a temperature at or near the pins reaching a threshold, a computing system of the vehicle can detect that a thermal event or fault may be occurring or will occur in the future. However, in some cases, if the thermal event or fault is detected responsive to the temperature reaching the threshold, a thermal event may manifest even if the vehicle stops charging. Using a temperature threshold to detect or prevent a thermal event may not stop charging fast enough to prevent the thermal event from occurring. For example, even though the temperature at or near the pins may be within normal ranges, e.g., 30 to 50 degrees Celsius, enough energy can already be accumulated at the plug such that even if the data processing system of the vehicle reduces (e.g., derates) or stops charging once the temperature at or near the pins reaches the threshold (e.g., 90 degrees Celsius), the thermal event will still occur. Therefore, it can be challenging to proactively predict a potential fault and stop the charging session early enough for the potential fault to be avoided, and furthermore inform the user and notify the charging station owner to prevent future issues.

To solve these and other technical problems, the present solution can include analyzing a gradient or derivative of temperature measurements of a charging plug to control the charging of a vehicle. A data processing system of a vehicle can calculate time derivatives of the temperature measurements of pins of a charging plug of a vehicle, the time derivative representing the pin heat load. In this regard, the data processing system can be predictive, and predict and prevent thermal events, even before a material of the charging plug reaches a temperature magnitude above a threshold.

Instead of, or in addition to using the magnitude of values or signals received from the temperature sensors, a data processing system can determine a derivative of the temperature values. If the derivative meets a threshold, the data processing system can detect that a thermal event will occur in the future if the vehicle continues charging at or above a particular rate. Responsive to the derivative meeting the threshold, the data processing system can reduce, derate, or stop charging of the vehicle. For example, the data processing system can determine, based on the derivative of the charging values, that the temperature measurements are changing at a rate above a threshold, and even though the magnitude of the temperature may be within acceptable ranges, e.g., 30 to 50 degrees Celsius, the data processing system can control charging of the vehicle to prevent the thermal event.

Furthermore, the data processing system of the vehicle can determine a derivative of temperature measurements of multiple different temperature sensors of multiple different pins of the charging plug. For example, the charging plug can include a first temperature sensor that measures temperature at a first pin of the charging plug and a second temperature sensor that measures temperature at a second pin of the charging plug. The data processing system can determine a derivative of the first measurements of the first temperature sensor and a second derivative of the second measurements of the second temperature sensor, each derivative representing a heat load at each respective pin. The data processing system can compare the derivatives against each other, e.g., take a difference of the derivatives. If the difference is greater than a level or threshold (e.g., an absolute value of the difference is greater than the level or threshold), the data processing system can determine to stop or reduce a rate of charging of the vehicle.

The thresholds that the derivatives of the temperature measurements can be compared to, or the threshold that the difference between the derivatives is compared to, can be set such that thermal events are prevented from occurring. The thresholds can be set via test data, e.g., data collected by the vehicle, collected by chargers, or collected by a cloud platform. The test data can include data of charging sessions of the vehicle or other vehicles where a fault occurred and where a fault did not occur. For example, at least one experiment, optimization, or selection can be performed based on the collected test data of past thermal events or faults for the same vehicle or different vehicles. The thresholds can be set once, updated over time as new test data is collected, or tuned to be specific to particular vehicles, vehicle models, or vehicle fleets.

Referring now to FIG. 1, among others, an example system 100 including a data processing system 110 that controls vehicle charging based on a derivative of a temperature signal is shown. The system 100 can be a system, apparatus, device, or component. The system 100 can be a vehicle, such as an electric vehicle, that charges via power received from a charger. The system 100 can be a charger that provides power to a vehicle to charge the vehicle. The system 100 or the data processing system 110 can be or include a server, server system, cloud platform, or remote computing device. The system 100 can include at least one data processing system 100. The data processing system 100 can be a computing system, apparatus, or device of a vehicle or charger. The data processing system 100 can be a microprocessor or microcontroller. The data processing system 100 can be a logic circuit, hardware circuit, or circuitry.

The system 100 can include a charging connector 105. The charging connector 105 can be a plug, device, or apparatus that couples with another plug, device, or apparatus. For example, the charging connector 105 can couple with or connect to another connector. For example, the charging connector 105 can be a receiver plug of a vehicle that a cable or connector of a charger is plugged into in order to charge the vehicle. The charging connector 105 can include one or multiple pins, e.g., pins 185 and 187. The pins 185 and 187 can be electrically conducting devices or components that electrically couple the vehicle with the charger. The pins 185 and 187 can electrically couple the charging connector 105 with the charger to receive power from the charger to charge the vehicle. For example, the pins 185 and 187 can insert into openings or cavities of a receiving connector of a charger, and electrically connect or touch the receiving connector to make an electrical connection between the vehicle and the charger. The pins 185 and 187 can include openings or cavities that connectors of the charger insert into.

The pins 185 and 187 can be positive pins, negative pins, ground pins, communication pins, etc. The pins 185 and 187 can include a positive DC pin to couple with a positive DC connection of a charger and a negative DC pin to couple with a negative DC connection with the charger. Via the positive and negative DC pins, the vehicle can receive or provide DC power. For example, the vehicle can receive DC power from the charger via the positive and negative DC pins and charge at least one battery, battery module, or battery pack of the vehicle. Furthermore, the charging connector 105 can include positive or negative AC pins, common or neutral pins, a pin for a first AC phase, a pin for a second AC phase, or a pin for a third AC phase.

The charging connector 105 can include at least one first temperature sensor 115. The temperature sensor 115 can be disposed at or near a first pin 185 of the charging connector 105 (e.g., a positive DC pin, a negative DC pin, a first phase AC pin, a second phase AC pin, or a third phase, AC pin, a ground pin, a neutral pin). The charging connector 105 can include at least one second temperature sensor 120. The second temperature sensor 120 can be disposed at or near a second pin 187 of the charging connector 105 (e.g., a positive DC pin, a negative DC pin, a first phase AC pin, a second phase AC pin, or a third AC pin). The temperature sensors 115 and 120 can be or include resistance temperature detectors (RTDs), negative temperature coefficient (NTC) thermistors, semiconductor sensors, or thermocouples.

The first temperature sensor 115 can be disposed at or near a first pin 185 of the charging connector 105. The second temperature sensor 115 can be disposed at or near a second pin 187 of the charging connector 105. For example, the first temperature sensor 115 can be thermally coupled with the first pin 185, or a material around the first pin 185, to measure a temperature at or near the first pin 185. The first sensor 115 can be disposed 0.5-1 centimeters (cm) from the first pin 185. The first sensor 115 can be disposed 0.25-1.25 cm from the first pin 185. The first sensor 115 can be disposed less than 0.25 cm from the first pin 185. The first sensor 115 can be disposed more than 1.25 cm from the first pin 185. The first sensor 115 can be disposed 3-8 cm from the first pin 185. The first sensor 115 can be disposed 1-10 cm from the first pin 185. The first sensor 115 can be disposed less than 1 cm from the first pin 185. The first sensor 115 can be disposed more than 10 cm from the first pin 185. The first sensor 115 can be disposed any distance from the first pin 185.

The second sensor 120 can be disposed 0.5-1 cm from the second pin 187. The second sensor 120 can be disposed 0.25-1.25 cm from the second pin 187. The second sensor 120 can be disposed less than 0.25 cm from the second pin 187. The second sensor 120 can be disposed more than 1.25 cm from the second pin 187. The second sensor 120 can be disposed 3-8 cm from the second pin 187. The second sensor 120 can be disposed 1-10 cm from the second pin 187. The second sensor 120 can be disposed less than 1 cm from the second pin 187. The second sensor 120 can be disposed more than 10 cm from the second pin 187. For example, the second temperature sensor 120 can be thermally coupled with the second pin 187, or a material around the second pin 187, to measure a temperature at or near the second pin 187. The second sensor 120 can be disposed any distance from the first pin 185.

The data processing system 110 can receive measurements of a temperature of the charging connector 105 the vehicle. The first temperature sensor 115 can produce or generate at least one first temperature signal 135. The second temperature sensor 120 can produce or generate at least one second temperature signal 140. The first temperature signal 135 or the second temperature signal 140 can be analog voltage signals, digital signals, timeseries, vector data, column data, event data, or other information. The data processing system 110 can receive the first temperature signal 135 from the first temperature sensor 115. The data processing system 110 can receive the second temperature signal 140 from the second temperature sensor 115. The data processing system 110 can measure a resistance, voltage, capacitance, inductance, or current that represents, is related to, or is proportional to a temperature measured by the first temperature sensor 115 or the second temperature sensor 120.

The data processing system 110 can include an analog to digital converter to sample an analog signal produced by the temperature sensor 115 or 120. The first temperature signal 135 and the second temperature signal 140 can be analog signals or digital signals. The data processing system 110 can sample analog versions of the first temperature signal 135 and the second temperature signal 140 to generate a digital version of the first temperature signal 135 and the second temperature signal 140. Each signal 135 and the signal 140 can include one, multiple, or a set of values or magnitudes indicating the temperature measured by the first temperature sensor 115 or the second temperature sensor 120 at multiple different points in time.

The data processing system 110 can include down sampling 145. The down sampling 145 can reduce the sample rate of the first temperature signal 135 or the second temperature signal 140. The down sampling 145 can reduce the sampling frequency of each signal 135 and 140 and filter the signals 135 and 140. For example, the down sampling 145 can apply a bandwidth reduction and sample-rate reduction. The down sampled versions of the signal 135 and the signal 140 can be provided to a filter 150.

The data processing system 110 can include at least one filter 150. The filter 150 can be a digital filter that removes or reduces the amplitude of high frequency components in the signals 135 and 140. The filter 150 can be a low pass filter. The filter 150 can be a finite impulse response or an infinite impulse response filter. The filter 150 can be a moving average filter, such as an exponential moving average filter. For example, the exponential filter can be defined as:

$$s_0 = x_0$$
$$s_t = \alpha x_t + (1-\alpha)s_{t-1}, t > 0$$

where α defines a filtering parameter, s defines the moving average, and x defines the samples of the signal 135 or 140. In some implementations, the filter 150 can be the exponential moving average filter in view of the low computational requirements required to implement the filter and the quick response which the exponential filter can provide, and therefore allow the data processing system 110 to quickly identify thermal faults or events from the signal 135 or 140.

The filter 150 can output a filtered version of the signals 135 and 140. The filter 150 can provide the filtered signals 135 and 140 to a derivative calculator 155 of the data processing system 110. The data processing system 110 can include at least one derivative calculator 155. The derivative calculator 155 can determine a derivative or derivative value of the first temperature signal 135 or the second temperature signal 140. The derivative calculator 155 can determine a derivative from or using measurements of the first sensor 115 and the second sensor 120. For example, the derivative calculator 155 can determine at least one derivative using the first temperature signal 135. The derivative calculator 155 can determine at least one derivative using the second temperature signal 140.

The derivative calculator 155 can determine a first derivative signal 160 from the first temperature signal 135. The derivative calculator 155 can determine a second derivative signal 165 from the second temperature signal 140. The first derivative signal 160 and the second derivative signal 165 can be first order derivatives. In some implementations, the first derivative signal 160 or the second derivative signal 165 are second order derivatives, third order derivatives, or any other order derivative. The first derivative signal 160 can be a series of derivatives or derivative values (e.g., first order derivatives) determined from the first temperature signal 135. The second derivative signal 165 can be a series of derivatives or derivative values (e.g., first order derivatives) determined from the second temperature signal 140. The derivative calculator 155 can determine new derivative values as new samples are received for the first temperature signal 135 and the second temperature signal 140. The derivatives determined by the derivative calculator 155 can be time derivatives that represent the rate at which the temperature measured by the first sensor 115 or the second sensor 120 changes. The derivative can indicate a rate at which temperature is changing at or near the first pin 185 or the second pin 187 of the charging connector 105. The derivative calculator 155 can provide the first derivative signal 160 and the second derivative signal 165 to a differential calculator 170 of the data processing system 110 and a fault identifier 180 of the data processing system 110.

The data processing system 110 can include at least one differential calculator 170. The differential calculator 170 can receive the first derivative signal 160 from the derivative calculator 155. The differential calculator 170 can receive the second derivative signal 165 from the derivative calculator 155. The differential calculator 170 can generate at least one difference or difference value by subtracting the first derivative signal 160 from the second derivative signal 165. The differential calculator 170 can generate the differential based on a subtraction of a first derivative from a second derivative. For example, the differential calculator 170 can generate the differential based on a subtraction of a derivative value of the first derivative signal 160 from a derivative value of the second derivative signal 165. For example, the differential calculator 170 can subtract the first derivative signal 160 from the second derivative signal 165. For each new value or sample of the first derivative signal 160 and the second derivative signal 165, the differential calculator 170 can generate a new difference or difference value. The resulting difference values determined by the differential calculator 170 from the first derivative signal 160 and the second derivative signal 165 can be a differential signal. The differential calculator 170 can determine an absolute value of each difference determined by the differential calculator 170. For example, an absolute value of each difference value determined by the differential calculator 170 can be added to the differential signal 175.

The fault identifier 180 can include at least one derivative analyzer 190 and at least one differential analyzer 183. The fault identifier 180 can cause the derivative analyzer 190 or the differential analyzer 183 to operate to predict a fault responsive to a determination that the vehicle is charging. For example, the fault identifier 180 can receive a current measurement from a current sensor 125 of the charging connector 105 indicating an amount of current received via the first pin 185 or the second pin 187. Furthermore, the fault identifier 180 can receive a voltage measurement from the voltage sensor 130 indicating a voltage measured across the first pin 185 or the second pin 187. Responsive to a detection based on the voltage or current, that the vehicle is charging, the fault identifier 180 can cause the derivative analyzer 190 or the differential analyzer 183 to analyze the derivative signals 160 and 165 or the differential signal 175 to detect or predict a thermal event. For example, responsive to detecting that the voltage measured by the voltage sensor 130 is greater than a threshold or responsive to detecting that the current measured by the current sensor is greater than a threshold, the fault identifier 180 can cause the derivative analyzer 190 or the differential analyzer 183 to determine if there is a charging fault. In some implementations, the fault identifier 180 can read a register or flag indicating that the vehicle is charging, and cause the differential analyzer 183 and the derivative analyzer 190 to operate responsive to reading a particular value in the register or flag.

The derivative analyzer 190 can analyze the first derivative signal 160 and the second derivative signal 165 to predict or determine a charging fault. For example, the derivative analyzer 190 can compare a first derivative determined from the first temperature signal 135 to a first threshold. The derivative analyzer 190 can compare a second derivative determined from the second temperature signal 140 to a second threshold. For example, as each new derivative value is determined by the derivative calculator 155 for the first derivative signal 160 and the second derivative signal 165, the derivative analyzer 190 can compare the new derivative values to the thresholds. The first threshold and the second threshold can be the same or different thresholds. The thresholds can be 0.1-3 degrees Celsius per second. The thresholds can be 0.05-3.5 degrees Celsius per second. The thresholds can be less than 0.05 degrees Celsius per second. The thresholds can be more than 3.5 degrees Celsius per second. The derivative analyzer 190 can determine that a thermal event exists, or will exist, if either the first derivative is greater or equal to the threshold or the second derivative is greater or equal to the threshold. The derivative analyzer 190 can determine that a thermal event exists, or will exist, if both the first derivative is greater or equal to the threshold and the second derivative is greater or equal to the threshold. For example, the derivative analyzer 190 can compare a first derivative of a temperature measured by the first temperature sensor 115 at a positive DC pin 185 to a first threshold and compare another derivative of a temperature measured by the second temperature sensor 120 at a negative DC pin 187 to a second threshold, and if either derivative is greater than the respective threshold, determine or predict a thermal event.

The derivative analyzer 190 can implement a debounce for the comparisons of the derivative signals 165 and 160 to the thresholds. For example, in order to reduce noise or falsely identifying or predicting a thermal event or fault, the derivative analyzer 190 can debounce the comparison of the derivatives to the thresholds. For example, the derivative analyzer 190 can compare the first derivative signal 160 to the first threshold and the second derivative signal 165 to a second threshold. If the first derivative signal 160 is greater than the threshold for a set length of time, the derivative analyzer 190 can identify or predict the thermal event. If the second derivative signal 165 is greater than the threshold for a set length of time, the derivative analyzer 190 can identify or predict the thermal event. The length of time can be 0.5-5 seconds. The length of time can be 0.05-5.5 seconds. The length of time can be less than 0.05 seconds. The length of time can be greater than 5.5 seconds.

The derivative analyzer 190 can identify that a number of consecutive samples of the first derivative signal 160 or the second derivative signal 165 are greater than the respective thresholds. For example, if the derivative analyzer 190 identifies that a particular number of sequential or consecutive samples of the first derivative signal 160 are greater than the threshold, the derivative analyzer 190 can identify or predict the thermal event. If the derivative analyzer 190 identifies that a particular number of sequential or consecutive samples of the second derivative signal 165 are greater than or equal to the threshold, the derivative analyzer 190 can identify or predict the thermal event. For example, the number of samples may be 1-5 samples. The number of samples may be greater than 5 samples.

The differential analyzer 183 can analyze the differential signal 175 to identify or predict a thermal event. The differential analyzer 183 can compare a differential, a difference, a value, or a sample determined from a subtraction of a first derivative representing a rate of change of temperature at the first pin 185 measured by the first sensor 115 from a second derivative representing a rate of change of a temperature at the second pin 187 measured by the second sensor 115. For example, the differential can be a difference between a sample of the first derivative signal 160 and a sample of the second derivative signal 165. The differential analyzer 183 can compare the difference to a threshold. Responsive to a determination that the difference is greater than or equal to the threshold, the differential analyzer 183 can identify a thermal event or predict that the thermal event will occur. The threshold can be 0.1-3 degrees Celsius per second. The threshold can be 0.05-3.5 degrees Celsius per second. The threshold can be less than 0.05 degrees Celsius per second. The threshold can be more than 3.5 degrees Celsius per second.

If the differential signal 175 is greater than the threshold for a set length of time, the differential analyzer 183 can identify or predict the thermal event. The length of time can be 0.5-5 seconds. The length of time can be 0.05-5.5 seconds. The length of time can be less than 0.05 seconds. The length of time can be greater than 5.5 seconds. If the differential analyzer 183 identifies that a particular number of sequential or consecutive samples of the differential signal 175 is greater than or equal to the threshold, the differential analyzer 183 can identify or predict the thermal event. For example, the number of samples may be 1-5 samples. The number of samples may be greater than 5 samples.

The thresholds used by the fault identifier 180 to identify the fault can be based on training data collected from the vehicle or from multiple other vehicles. The training data can include temperatures measured by temperature sensors at or near pins 185 and 187 and indications of whether faults or thermal events occurred (e.g., a temperature magnitude crossing a threshold). The data processing system 110 or another system, e.g., a cloud or server system, can collect temperature and fault data from multiple vehicles to generate a repository of training data. The data processing system 110 or another system can execute at least one optimization or selection algorithm to determine values for the thresholds can include a bracketing algorithm, a local descent algorithm, a first order algorithm, a second order algorithm, etc. The data processing system 110 or another system can determine thresholds for specific vehicles or specific vehicle types. For example, the data processing system 110 or another system can generate a training data set by identifying data collected from vehicles of a specific vehicle type or model. The data processing system 110 can then use the training data to generate thresholds for the specific vehicle type or model and deploy the thresholds to vehicles of the same type or model. The data processing system 110 can generate the thresholds on a vehicle specific level. For example, the data processing system 110 can generate a training dataset for one or multiple vehicles based on data collected from said vehicle. The data processing system 110 can use the training dataset to generate thresholds specific to the vehicle and deploy the thresholds to the vehicle for implementation. Furthermore, the data processing system 110 can generate the thresholds on a fleet level. For example, the data processing system 110 can collect data from vehicles of a particular fleet to generate a training dataset for the fleet. The data processing system 110 can generate thresholds for the fleet based on the training dataset, and deploy the thresholds to the vehicles of the fleet for implementation.

The data processing system 110 can include at least one charging controller 195. The charging controller 195 can control charging of the vehicle via the charging connector 105. The charging controller 195 can control charging of the vehicle based on the derivative of measurements of the first temperature sensor 115 and a second derivative of second measurements of the second temperature of the second temperature sensor 120. For example, the charging controller 195 can control the charging of the vehicle based on the first derivative signal 160, the second derivative signal 165, or the differential signal 175. For example, the data processing system 110 can reduce the rate at which the vehicle charges, increase the rate at which the vehicle charges, or stop the vehicle from charging. The charging controller 195 can derate charging of the vehicle. The charging controller 195 can reduce the rate at which the vehicle charges or stop the vehicle from charging responsive to the differential analyzer 183 identifying or predicting a thermal event, e.g., the differential analyzer 183 identifying that the differential signal 175 is greater than or equal to a threshold.

The charging controller 195 can reduce the rate at which the vehicle charges or stop the vehicle from charging responsive to the differential analyzer 183 identifying or predicting a thermal event, e.g., the differential analyzer 183 identifying that the differential signal 175 is greater than or equal to a threshold. Furthermore, the charging controller 195 can reduce the rate at which the vehicle charges or stop the vehicle from charging responsive to at least one of the derivative analyzer 190 identifying or predicting a thermal event, e.g., the differential analyzer 183 identifying the first derivative signal 160 or the second derivative signal 165 exceeding a threshold.

The charging controller 195 can implement a control algorithm that reduces or increases the rate at which the vehicle charges based on the differential signal 175, the first derivative signal 160, or the second derivative signal 165. For example, the greater the value of the differential signal 175, the first derivative signal 160, or the second derivative signal 165, the greater the reduction in charging rate. The reduction in charging rate can be a reduction in power, current, or voltage. In some implementations, the charging controller 195 can implement a control algorithm such as a proportional integral derivative (PID) algorithm, a machine learning model, or another control model to control charging of the vehicle based on the first derivative signal 160, the second derivative signal 165, or the differential signal 175.

The charging controller 195 can operate a distribution box 193 to control charging of the vehicle. The distribution box 193 can be a box of switches, disconnects, or contactors that switch electrical connections between a battery, battery module, or battery pack of a vehicle and loads of the vehicle (e.g., motors, heaters, lights, air conditioning systems). Furthermore, the distribution box 193 can electrically couple the battery, battery module, or battery pack with the pins 185 and 187 of the charging connector 105 to receive power from the charger and charge the battery, battery module, or battery pack. To reduce the rate at which the vehicle charges, or to stop the vehicle from charging, the charging controller 195 can operate the electrical devices or components of the distribution box 193. For example, responsive to detecting that the differential signal 175, the second derivative signal 165, or the first derivative signal 160 exceed a threshold, the charging controller 195 can operate contactors or switches of the distribution box 193 to disconnect the battery, battery module, or battery pack from the charging connector 105 and the charger to stop charging.

In some implementations, the charging controller 195 can send a command or message to a charger that is providing power to the vehicle. The command can cause the charger to stop providing power to the vehicle or reduce a rate at which the vehicle charges. The charging controller 195 can transmit the command with a value indicating the rate at which to provide charge the vehicle or a power level to use in charging the vehicle. The command can include an amount to increase or decrease a charging rate or an amount to increase or decrease a power level used to charge the vehicle.

The data processing system 110 can include at least one flag setter 197. The flag setter 197 can set, reset, activate, or deactivate a flag. The flag can indicate that the data processing system 110 has identified a thermal event, predicted that a thermal event will occur, identified a fault, or predicted that a fault will occur. Responsive to the flag being set, at least one display, user interface, or human machine interface can display an alert, user interface element, or notification indicating that the fault or thermal event has been identified or predicted. For example, a dash of the vehicle including a user interface or display can cause a notification to be displayed to a driver or passenger of the vehicle responsive to the flag being set by the flag setter 197.

Figure 2:
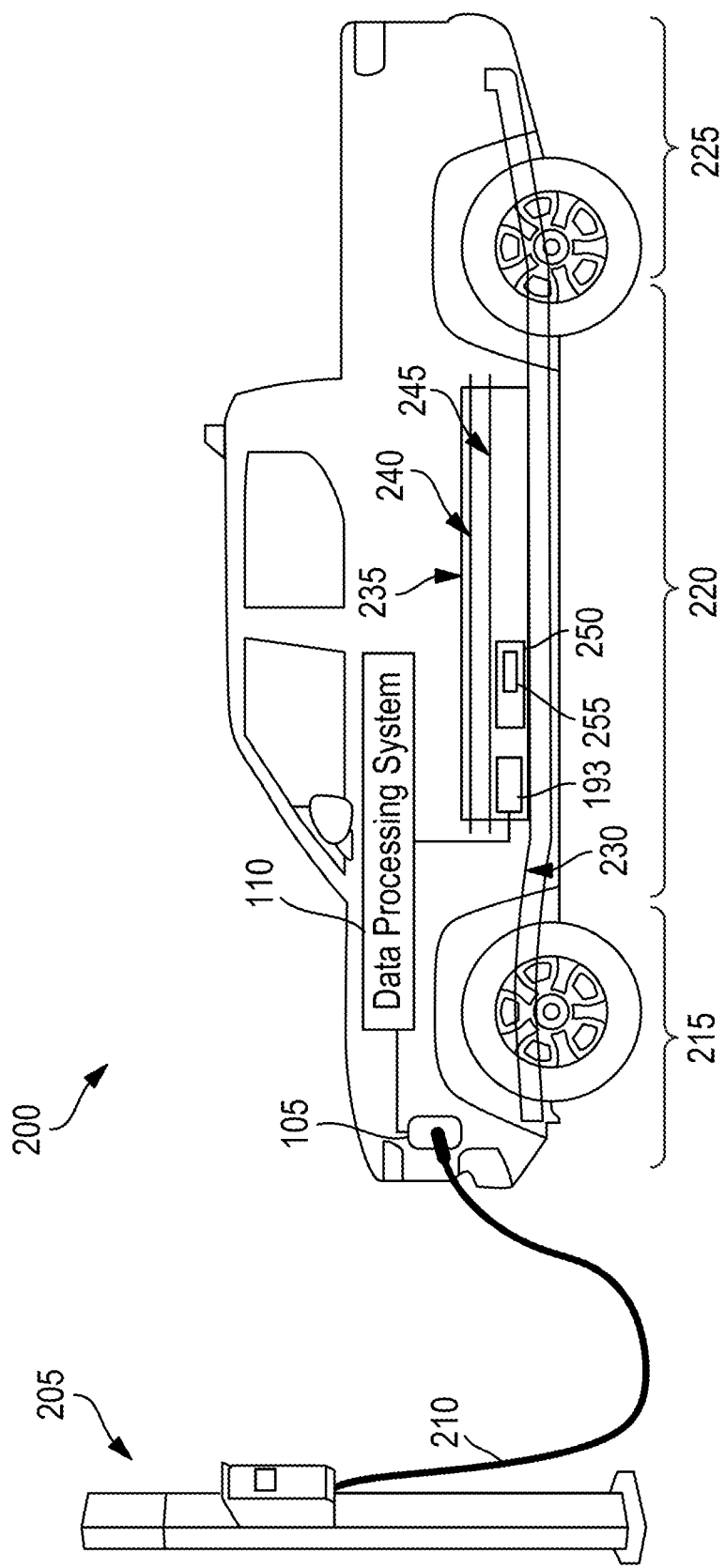
FIG. 2 depicts an example vehicle including a data processing system that controls charging with a charger based on a derivative of a temperature signal.

Referring now to FIG. 2, among others, an example vehicle 200 including the data processing system 110 that controls charging with a charger 205 based on a derivative of a temperature signal is shown. The vehicle 200 is shown to include the charging connector 105 and the data processing system 110. The charging connector 105 can be coupled with a cable or harness 210 of a charger 205. The charger 205 can be an AC or DC vehicle charger that provides power via one or more conductors, wires, or cables 210 to the vehicle 200. The cable 210 can plug into the charging connector 105 and make electrical connections via pins 185 and 187 of the charging connector 105. The pins 185 and 187 can make electrical connections with the distribution box 193. The distribution box 193 can charge a battery pack 235, a battery module 250, or a battery cell 255 of the vehicle based on power received from the charger 205, the cable 210, and the charging connector 105 (e.g., the pins 185 and 187 of the charging connector 105).

The electric vehicle 200 can be installed with at least one battery pack 235. Electric vehicles 200 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 235 can also be used as an energy storage system to power a building, such as a residential home or commercial building. Electric vehicles 200 can be fully electric or partially electric (e.g., plug-in hybrid) and further, electric vehicles 200 can be fully autonomous, partially autonomous, or unmanned. Electric vehicles 200 can also be human operated or non-autonomous. Electric vehicles 200 such as electric trucks or automobiles can include on-board battery packs 235, batteries 250 or battery modules 250, or battery cells 255 to power the electric vehicles. The electric vehicle 200 can include a chassis 230 (e.g., a frame, internal frame, or support structure). The chassis 230 can support various components of the electric vehicle 200. The chassis 230 can span a front portion 215 (e.g., a hood or bonnet portion), a body portion 220 and a rear portion 225 (e.g., a trunk, payload, or boot portion) of the electric vehicle 200. The battery pack 235 can be installed or placed within the electric vehicle 200. For example, the battery pack 235 can be installed on the chassis 230 of the electric vehicle 200 within one or more of the front portion 215, the body portion 220, or the rear portion 225. The battery pack 235 can include or connect with at least one busbar, e.g., a current collector element. For example, the first busbar 240 and the second busbar 245 can include electrically conductive material to connect or otherwise electrically couple the battery 235, the battery modules 250, or the battery cells 255 with other electrical components of the electric vehicle 200 to provide electrical power to various systems or components of the electric vehicle 200.

Figure 3:
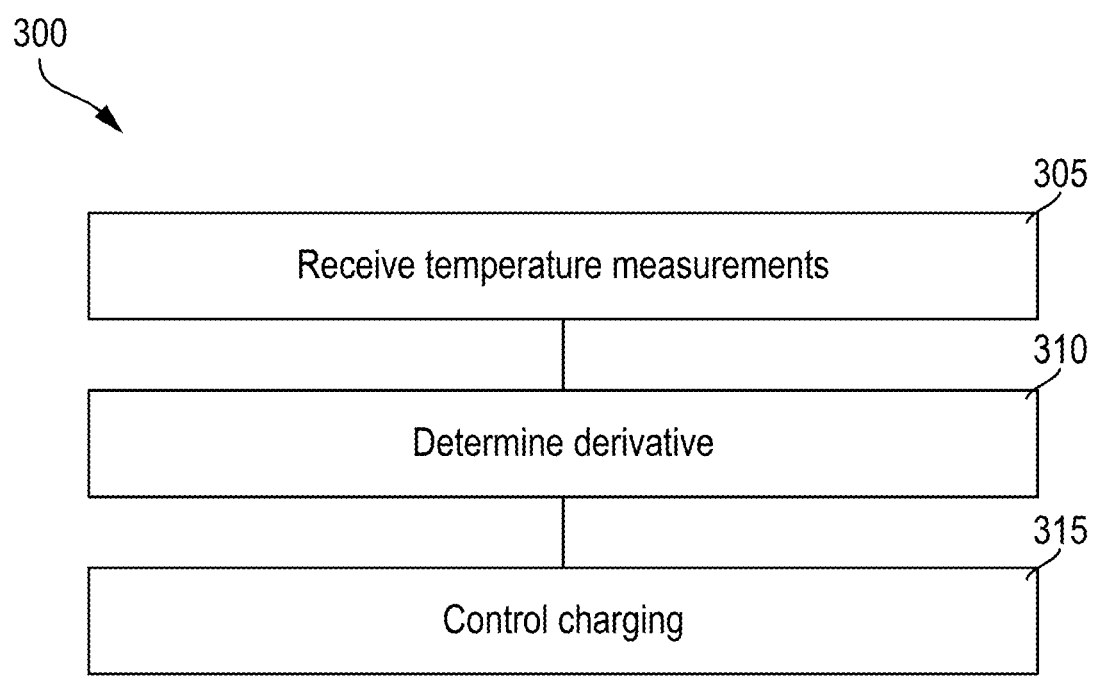
FIG. 3 depicts an example method of controlling vehicle charging based on a derivative of a temperature signal.

Referring now to FIG. 3, among others, an example method 300 of controlling vehicle charging based on a derivative of a temperature signal is shown. The vehicle 200, the data processing system 110, the distribution box 193, or the charger 205 can perform at least a portion of the method 300. The method 300 can be implemented by software components or instructions or hardware components or circuits. The method 300 can include an ACT 305 of receiving temperature measurements. The method 300 can include an ACT 310 of determining a derivative. The method 300 can include an ACT 315 of controlling charging.

At ACT 305, the method 300 can include receiving, by the data processing system 110, temperature measurements. The temperature measurements can be received as a signal from a sensor. For example, the data processing system 110 can receive the first temperature signal 135 from a first temperature sensor 115. The data processing system 110 can receive the second temperature signal 140 from the second temperature sensor 120. The first temperature sensor 115 can be disposed within the charging connector 105 at or near a first pin 185 of the charging connector 105, e.g., a positive DC pin of the charging connector 105 that couples with the charger 205 to receive power from the charger 205 to charge the vehicle 200. The second temperature sensor 120 can be disposed within the charging connector 105 at or near a second pin 187 of the charging connector 105, e.g., a negative DC pin of the charging connector 105 that couples with the charger 205 to receive power from the charger 205 to charge the vehicle 200.

At ACT 310, the method 300 can include determining, by the data processing system 110, a derivative. The data processing system 110 can down sample and filter the measurements received at ACT 305, e.g., the first temperature signal 135 and the second temperature signal 140. The data processing system 110 can then determine a derivative of the temperature measurements. For example, the derivative calculator 155 can determine a first derivative signal 160 by computing a first order time derivative of the first temperature signal 135. For example, the derivative calculator 155 can determine a second derivative signal 165 by computing a first order time derivative of the second temperature signal 140. Furthermore, with the derivatives of the first temperature signal 135 and the second temperature signal 140, the differential calculator 170 can determine a differential or differential signal 175. For example, the differential calculator 170 can subtract the first derivative signal 160 from the second derivative signal 165. The differential analyzer 183 can determine an absolute value of the resulting differential, difference, or subtraction of the derivative signals 160 and 165. The differential signal 175 can include absolute values of the differences between the first derivative signal 160 and the second derivative signal 165 at multiple points in time.

At ACT 315, the method 300 can include controlling, by the data processing system 110, charging. The data processing system 110 can control the charging of the vehicle 200 at the charger 205 based on the derivatives of the temperature measurements or the differences between the derivatives of the temperature measurements of the first sensor 115 and the second sensor 120. For example, the fault identifier 180 can compare the first derivative signal 160 or the second derivative signal 165 to a threshold. If either of the first derivative signal 160, the second derivative signal 165, or the differential signal 175 is greater than the threshold, the fault identifier 180 can identify that the vehicle 200 is experiencing a thermal event or predict that the vehicle 200 will experience the thermal event.

Figure 4:
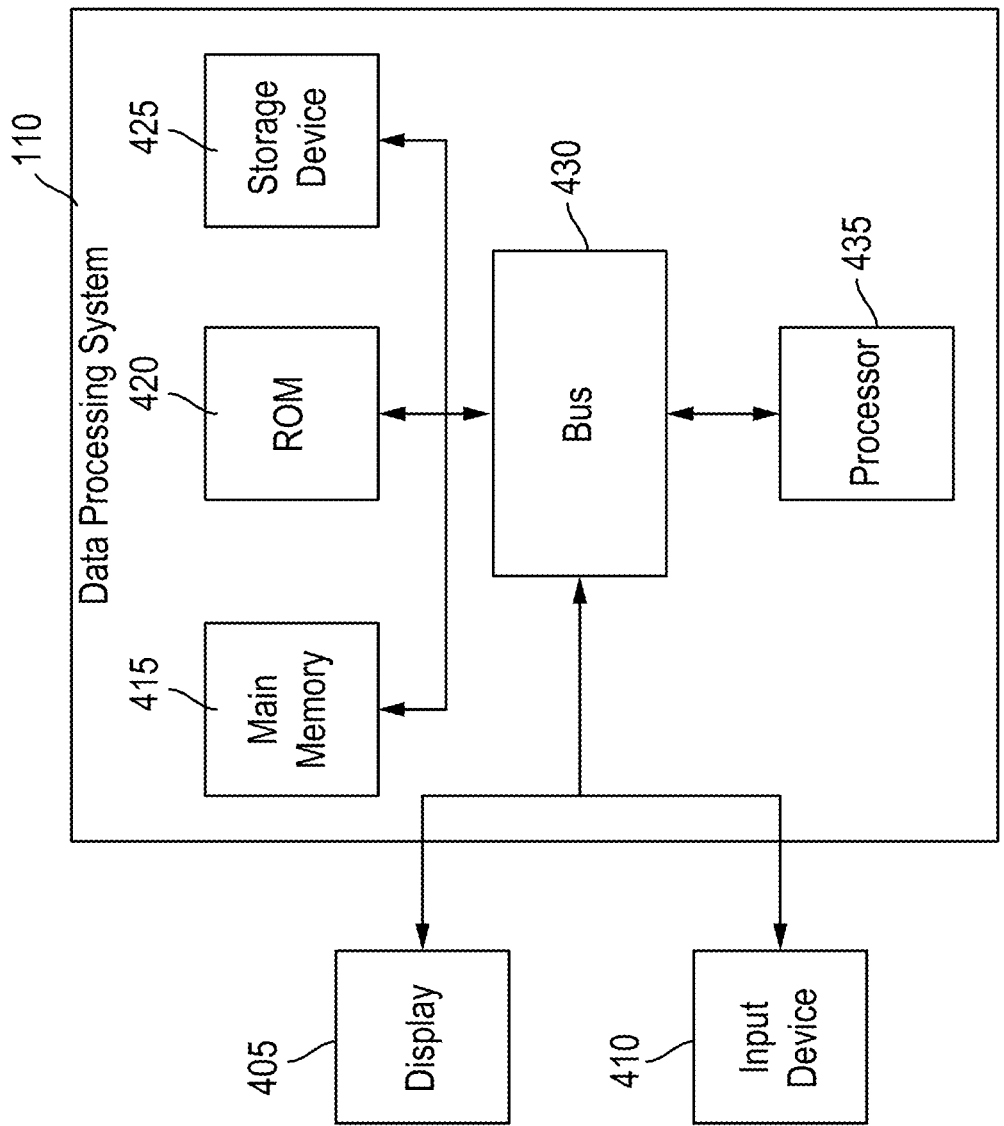
FIG. 4 depicts an architecture for a data processing system that can be employed to implement elements of the systems and methods described and illustrated herein.

Referring now to FIG. 4, among others, an example block diagram of the data processing system 110 is shown. FIG. 4 depicts a computer system that can include or be used to implement a data processing system or its components. The data processing system 110 includes at least one bus 430 or other communication component for communicating information and at least one processor 435 or processing circuit coupled to the bus 430 for processing information. The data processing system 110 can also include one or more processors 435 or processing circuits coupled to the bus for processing information. The data processing system 110 can include at least one main memory 415, such as a random access memory (RAM) or other dynamic storage device, coupled to the bus 430 for storing information, and instructions to be executed by the processor 435. The main memory 415 can be used for storing information during execution of instructions by the processor 435. The data processing system 110 can further include at least one read only memory (ROM) 420 or other static storage device coupled to the bus 430 for storing static information and instructions for the processor 435. A storage device 425, such as a solid state device, magnetic disk or optical disk, can be coupled to the bus 430 to persistently store information and instructions.

The data processing system 110 may be coupled via the bus 430 to a display 405, such as a liquid crystal display, or active matrix display, for displaying information to a user such as a driver, rider, or user of the vehicle 200 or other end user. An input device 410, such as a keyboard or voice interface may be coupled to the bus 430 for communicating information and commands to the processor 435. The input device 410 can include a touch screen display 405. The input device 410 can also include a cursor control, such as a mouse, a trackball, or cursor direction keys, for communicating direction information and command selections to the processor 435 and for controlling cursor movement on the display 405.

The processes, systems and methods described herein can be implemented by the data processing system 110 in response to the processor 435 executing an arrangement of instructions contained in main memory 415. Such instructions can be read into main memory 415 from another computer-readable medium, such as the storage device 425. Execution of the arrangement of instructions contained in main memory 415 causes the data processing system 110 to perform the illustrative processes described herein. One or more processors in a multi-processing arrangement may also be employed to execute the instructions contained in main memory 415. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, instead of, or in addition to implementing the techniques disclosed herein in a vehicle, the techniques can be implemented in a charger. For example, a charger can include temperature sensors at or near pins, prongs, or or plugs of the charger. If a derivative of the measurements of the temperature sensors, or a difference between the derivatives is greater than a threshold, the charger can stop or reduce charging of a vehicle. For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system, comprising:
   a sensor to measure a temperature of a connector of a vehicle, the connector to charge the vehicle, the sensor disposed at a pin of the connector, the pin to receive power from a charger; and
   a data processing system comprising one or more memory devices coupled with one or more processors to:
      receive a plurality of measurements of the temperature from the sensor;
      determine a derivative using the plurality of measurements to detect a rate of change of the temperature at the pin; and
      control charging of the vehicle based on the derivative.

2. The system of claim 1, comprising:
   the data processing system to:
      compare the derivative to a threshold; and
      reduce a rate that the vehicle charges at or stop the vehicle from charging responsive to a determination that the derivative is greater than the threshold.

3. The system of claim 1, comprising:
   the data processing system to:
      determine the derivative using the plurality of measurements of the temperature received from the sensor;
      determine a second derivative using a second plurality of measurements received from a second sensor, the second sensor to measure a second temperature, the second sensor disposed at a second pin of the connector, the second pin to receive the power from the charger;
      compare the derivative to a first threshold;
      compare the second derivative to a second threshold; and
      reduce a rate that the vehicle charges at or stop the vehicle from charging responsive to a determination that the derivative is greater than the first threshold or the second derivative is greater than the second threshold.

4. The system of claim 1, comprising:
   the data processing system to:
      determine the derivative using the plurality of measurements of the temperature received from the sensor, the pin to electrically couple with the charger to receive the power from the charger;
      determine a second derivative using a second plurality of measurements of a second temperature received from a second sensor, the second sensor to measure the second temperature, the second sensor disposed at a second pin of the connector, the second pin to electrically couple with the charger to receive the power from the charger;
      generate a differential based on a subtraction of the derivative from the second derivative;
      compare the differential to a threshold; and
      reduce a rate that the vehicle charges at or stop the vehicle from charging responsive to a determination that the differential is greater than the threshold.

5. The system of claim 1, comprising:
   the connector to couple with the charger to receive the power from the charger to charge a battery of the vehicle, the connector comprising:
      the pin to electrically couple with the charger; and
      the sensor disposed at the pin to measure the temperature at the pin.

6. The system of claim 1, comprising:
   the connector to couple with the charger to receive the power from the charger to charge a battery of the vehicle, the connector comprising:
      the pin to electrically couple with the charger;
      the sensor disposed at the pin to measure the temperature at the pin, wherein the sensor is a first temperature sensor;
      a second pin to electrically couple with the charger; and
      a second temperature sensor disposed at the second pin to measure a second temperature at the second pin; and
   the data processing system to:
      control charging of the vehicle based on the derivative of the plurality of measurements of the first temperature sensor and a second derivative of a plurality of second measurements of the second temperature of the second temperature sensor.

7. The system of claim 1, comprising:
   the data processing system to:
      determine, based on the plurality of measurements of the temperature, a signal comprising plurality of derivatives of the temperature;
      determine that the signal is greater than a threshold for a predefined length of time; and
      reduce a rate that the vehicle charges at or stop the vehicle from charging responsive to a determination that the signal is greater than the threshold for the predefined length of time.

8. The system of claim 1, comprising:
   the data processing system to:
      determine a signal comprising a plurality of differences between the derivative of the plurality of measurements of the temperature of the sensor and a second derivative of a second plurality of measurements of a second temperature of a second sensor,
      the sensor to measure the temperature at the pin of the connector and the second sensor to measure the second temperature at a second pin of the connector;
      determine that the signal is greater than a threshold for a predefined length of time; and
      reduce a rate that the vehicle charges at or stop the vehicle from charging responsive to a determination that the signal is greater than the threshold for the predefined length of time.

9. A method, comprising:
   receiving, by a data processing system comprising one or more memory devices coupled with one or more processors, a plurality of measurements of a temperature of a connector of a vehicle, the connector to charge the vehicle;

determining, by the data processing system, based on the plurality of measurements of the temperature, a signal comprising a plurality of derivatives of the temperature;

determining, by the data processing system, that the signal is greater than a threshold for a predefined length of time; and controlling, by the data processing system, charging of the vehicle based on the plurality of derivatives by reducing a rate that the vehicle charges at or stopping the vehicle from charging responsive to a determination that the signal is greater than the threshold for the predefined length of time.

10. The method of claim 9, comprising:

measuring, by a sensor, the temperature, the sensor disposed at a pin of the connector, the pin to receive power from a charger;

receiving, by the data processing system, the plurality of measurements of the temperature from the sensor; and determining, by the data processing system, the plurality of derivatives using the plurality of measurements to detect a rate of change of the temperature at the pin.

11. The method of claim 9, comprising:

comparing, by the data processing system, the signal to the threshold; and reducing, by the data processing system, based on the comparison to the threshold, the rate that the vehicle charges at or stopping, by the data processing system, the vehicle from charging.

12. The method of claim 9, comprising:

determining, by the data processing system, a first derivative of the plurality of derivatives using the plurality of measurements of the temperature received from a first sensor, the first sensor to measure the temperature, the first sensor disposed at a first pin of the connector, the first pin to receive power from a charger;

determining, by the data processing system, a second derivative of the plurality of derivatives using a second plurality of measurements received from a second sensor, the second sensor to measure a second temperature, the second sensor disposed at a second pin of the connector, the second pin to receive the power from the charger;

comparing, by the data processing system, the first derivative to a first threshold;

comparing, by the data processing system, the second derivative to a second threshold; and reducing, by the data processing system, the rate that the vehicle charges at or stopping, by the data processing system, the vehicle from charging responsive to a determination that the first derivative is greater than the first threshold or the second derivative is greater than the second threshold.

13. The method of claim 9, comprising:

determining, by the data processing system, a first derivative of the plurality of derivatives using the plurality of measurements of the temperature received from a first sensor, the first sensor to measure the temperature, the first sensor disposed at a first pin of the connector, the first pin to electrically couple with a charger to receive power from the charger;

determining, by the data processing system, a second derivative of the plurality of derivatives using a second plurality of measurements of a second temperature received from a second sensor, the second sensor to measure the second temperature, the second sensor disposed at a second pin of the connector, the second pin to electrically couple with the charger to receive the power from the charger;

generating, by the data processing system, a differential based on a subtraction of the first derivative from the second derivative;

comparing, by the data processing system, the differential to the threshold; and reducing, by the data processing system, the rate that the vehicle charges at or stop the vehicle from charging responsive to a determination that the differential is greater than the threshold.

14. The method of claim 9, comprising:

coupling, the connector with a charger to receive power from the charger to charge a battery of the vehicle, the connector comprising:

a pin to electrically couple with the charger; and a sensor disposed at the pin to measure the temperature at the pin; and determining, by the data processing system, a first derivative of the plurality of derivatives using the plurality of measurements of the temperature received from the sensor, wherein the first derivative indicates a rate of change of the temperature at the pin.

15. The method of claim 9, comprising:

determining, by the data processing system, the signal comprising a plurality of differences between a first derivative of the plurality of derivatives of a first portion of the plurality of measurements of the temperature of a first sensor and a second derivative of the plurality of derivatives of a second portion of the plurality of measurements of a second temperature of a second sensor, the first sensor to measure the temperature at a first pin of the connector and the second sensor to measure the second temperature at a second pin of the connector.

16. One or more storage medium storing instructions thereon, that, when executed by one or more processors, cause the one or more processors to:

receive a plurality of measurements of a temperature of a connector of a vehicle, the connector to charge the vehicle;

determine a derivative using the plurality of measurements of the temperature received from a first sensor, the first sensor to measure the temperature, the first sensor disposed at a first pin of the connector, the first pin to receive power from a charger;

determine a second derivative using a second plurality of measurements received from a second sensor, the second sensor to measure a second temperature, the second sensor disposed at a second pin of the connector, the second pin to receive the power from the charger;

compare the derivative to a first threshold;

compare the second derivative to a second threshold; and control charging of the vehicle by reducing a rate that the vehicle charges at or by stopping the vehicle from charging, responsive to a determination that the derivative is greater than the first threshold or the second derivative is greater than the second threshold.

17. The one or more storage medium of claim 16, wherein the instructions cause the one or more processors to determine the derivative using the plurality of measurements to detect a rate of change of the temperature at the first pin.

18. The one or more storage medium of claim 16, wherein the instructions cause the one or more processors to:

determine the derivative using the plurality of measurements of the temperature received from the first sensor the first pin to electrically couple with the charger to receive the power from the charger;
determine the second derivative using the second plurality of measurements of the second temperature received from the second sensor, the second pin to electrically couple with the charger to receive the power from the charger;
generate a differential based on a subtraction of the derivative from the second derivative;
compare the differential to a third threshold; and
reduce the rate that the vehicle charges at or stop the vehicle from charging responsive to a determination that the differential is greater than the third threshold.

* * * * *